(12) United States Patent
Zimmermann et al.

(10) Patent No.: US 6,328,655 B1
(45) Date of Patent: Dec. 11, 2001

(54) ADAPTER SYSTEM

(75) Inventors: Heinrich Zimmermann, Waghäusel; Günter Oberländer, Kraichtal; Norbert Mensing, Karlsdorf-Neuthard, all of (DE)

(73) Assignee: Sew-Eurodrive GmbH & Co., Bruschsal (DE)

( * ) Notice: Subject to any disclaimer, the term of this patent is extended or adjusted under 35 U.S.C. 154(b) by 0 days.

(21) Appl. No.: 09/254,813

(22) PCT Filed: Sep. 12, 1997

(86) PCT No.: PCT/EP97/04988

§ 371 Date: Mar. 12, 1999

§ 102(e) Date: Mar. 12, 1999

(87) PCT Pub. No.: WO98/11651

PCT Pub. Date: Mar. 19, 1998

(30) Foreign Application Priority Data

Sep. 13, 1996 (DE) .............................................. 196 37 361

(51) Int. Cl.⁷ ...................................................... F16D 3/84
(52) U.S. Cl. ........................... 464/178; 464/170; 464/177
(58) Field of Search ................................... 464/178, 170, 464/177

(56) References Cited

U.S. PATENT DOCUMENTS

| | | |
|---|---|---|
| 2,526,964 | 10/1950 | Muller . |
| 2,762,232 | 9/1956 | Bade . |
| 2,944,433 | 7/1960 | Myers . |
| 3,363,435 | 1/1968 | Crow . |
| 3,959,990 * | 6/1976 | Golitz .................................. 464/178 |
| 4,307,583 * | 12/1981 | Hall ...................................... 464/177 |
| 5,045,026 * | 9/1991 | Buse ..................................... 464/177 |
| 5,490,682 * | 2/1996 | Radosav et al. ...................... 277/815 |
| 5,685,203 * | 11/1997 | Richardson et al. ................. 464/178 |

FOREIGN PATENT DOCUMENTS

| | | |
|---|---|---|
| 0 567 048 A | 10/1993 | (EP) . |
| 2 231 145 A | 12/1974 | (FR) . |
| 2 237 524 A | 2/1975 | (FR) . |
| 2 245 113 A | 4/1975 | (FR) . |

OTHER PUBLICATIONS

Gatriebe XP–002052149 Kompaktgetriebe für den Industrie–Einsatz Bd. 20, Nr. 1–2, 1981, Mainz DE, Seite 23 sieche Tabelle 3.

* cited by examiner

*Primary Examiner*—Lynne H. Browne
*Assistant Examiner*—Aaron M Dunwoody
(74) *Attorney, Agent, or Firm*—Marshall, Gerstein & Borun

(57) ABSTRACT

An adapter system to connect a main shaft (9) of an electric motor to a device to be driven, in particular to a pinion of a gearing, is disclosed. The system comprises an adapter shaft (10) with a pinion attachment (11) on a first end, for rotationally stable connection to the pinion. A housing (20) is provided with devices (21, 22) to serve as bearings for the adapter shaft (10) and with a first flange (23) for attaching the housing to the gearing and with a second flange (24) for attaching it to the motor, such that the motor is substantially firmly connected to the gearing by way of the housing (20). A coupling element (40) can be connected to the motor shaft (9) in a rotationally stable manner. On the coupling element (40) there is formed a first driving means (41, 41') and on the adapter shaft (10) is formed a second driving means (12, 12'), which has a shape corresponding to that of the first driving means (41, 41') and engages therewith so as to transmit a torque between the first coupling element (40) and the adapter shaft (10). The first driving means (41, 41') is so disposed that it can move with respect to the second driving means (12, 12') at least in a direction (y) perpendicular to the axis of rotation (x) of the adapter shaft (10) and at an angle (α) with respect to the axis of rotation (x). With an adapter system constructed in this way, a plurality of different motors can be connected in a simple manner to a plurality of different devices to be driven, in particular gearings.

38 Claims, 9 Drawing Sheets

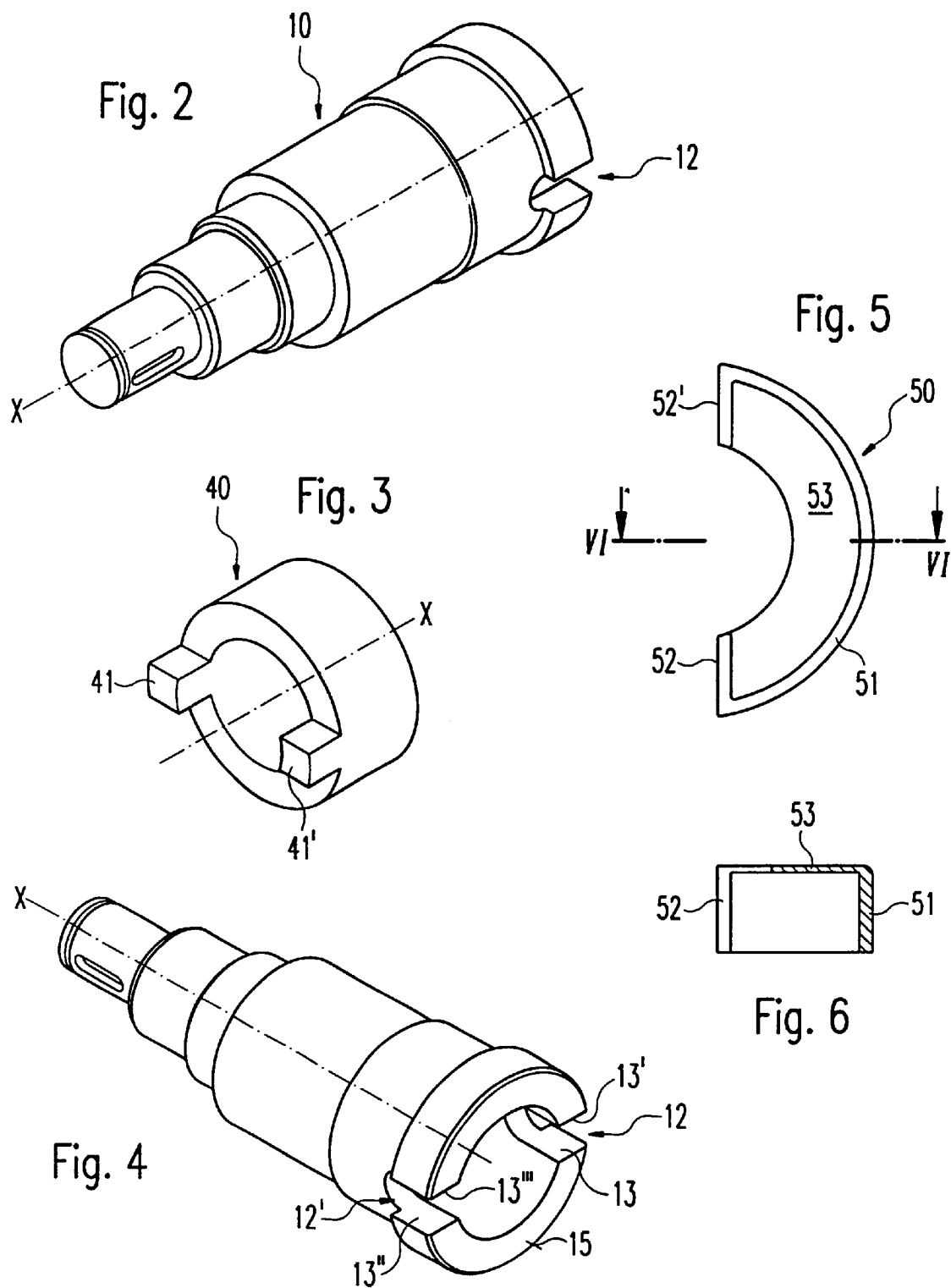

ADAPTER SYSTEM

BACKGROUND OF THE INVENTION

The invention relates to an adapter system to connect the main shaft of a motor to a device to be driven, in particular to a pinion of a gearing.

Because the tasks to be performed in the field of motive power engineering are so diverse, it is important for particularly variable systems to be designed. On the one hand it should be possible to employ motors, in particular electric motors, of various types of construction; on the other hand, these electric motors should be able to drive apparatus of widely differing kinds, for example all sorts of gearings with corresponding (varied) driving pinions. Even when both the motors and the gearings are provided by a single manufacturer, so that there is no substantial problem with respect to fitting the parts together, the effort and expense of manufacturing and stocking the parts are nevertheless considerable. This is quite apparent from the laws of combinatorics, in view of the fact that different motors with different ways of being installed or mounted must be adapted to to gearings (or the reverse) that in turn have a variety of relevant dimensions.

SUMMARY OF THE INVENTION

The object of the invention is to disclose an adapter system to connect a main shaft of an (electric) motor to a device to be driven, in particular to a pinion of a gearing, which by simple means ensures a greater variability of combinations together with high operating reliability.

This object is achieved by an adapter system in accordance with the present invention.

It is an essential point of the invention that a system is created by means of which it is possible to compensate for the "imprecisions" encountered when different systems (motor/gearing) are put together.

In the case of the adapter system to connect a main shaft of an (electric) motor to a device to be driven, in particular to a pinion of a gearing, in accordance with the invention this is brought about by providing an adapter shaft with a pinion attachment at a first end to make rotationally stable connection with the pinion, a housing with means for supporting the adapter shaft with a first flange to be fixed to the gearing and with a second flange to be fixed to the motor such that the motor is substantially firmly connected to the gearing by way of the housing, a coupling element that is connected to the motor shaft in a rotationally stable manner and a first driving means on the coupling element and a second driving means on the second end of the adapter shaft, shaped to correspond to the first driving means and engaged therewith so as to transmit torque between the coupling element and the adapter shaft, the first and the second driving means being so constructed that they can move relative to one another at least in a direction perpendicular to an axis of rotation of the adapter shaft and at an angle to the axis of rotation.

Preferably the first and the second driving means are in addition so constructed as to be movable relative to one another in a direction parallel to the axis of rotation of the adapter shaft, with the result that the range of possible variations in adapting motors and gearings of different dimensions is further increased.

The adapter shaft is preferably mounted in the housing in a statically determined manner, which can be achieved in particular by providing two bearings spaced apart along the axis of rotation, preferably roller bearings disposed in the housing. As a result, there is no longer any need to provide in the gearing an additional bearing of the adapter shaft with pinion attached thereto. It is further possible to place on the shaft something other than the pinion, for example a pulley, so that instead of a spur gear, a belt drive train can be used as the device to be driven.

In one preferred embodiment of the invention the first driving means comprises at least one notch with parallel walls, disposed symmetrically with respect to a plane passing substantially through the axis of rotation, in which case the second driving means comprises at least one projection, which can be inserted into the at least one notch. This embodiment of the invention is relatively easy to manufacture and nevertheless effective.

The at least one projection in this arrangement is made thinner than the at least one notch, to ensure a certain amount of play in the direction of rotation between the notch walls and the at least one projection, so that not only an axial offset but also an "angular error" can be compensated.

Preferably a separator is provided to be inserted between at least one of the notch walls and the at least one projection, in particular a separator such as to prevent direct contact between the projection and the notch walls (preferably in both directions).

In order both to reduce frictional wear and also to ensure that there is no play when the direction of the torque to be transmitted is reversed, the separator is preferably made elastically deformable and manufactured with dimensions such that it exerts a tensile force upon the at least one projection in the at least one notch. As a result, even when the direction of the load changes—as indicated above—impacts are avoided and the torque is transmitted without jolts. In addition, the separator is formed of a material suitable to reduce the friction between the notch walls and the at least one projection, which further reduces the susceptibility of the system to wear and tear.

Preferably the first flange is attached to a first half of the housing and the second flange, to a second half of the housing, the two half-housings being detachably joined to one another, in particular by threaded bolts. This measure makes the adapter system very easy to install.

It is especially preferred in this embodiment that a plurality of first and second half-housings is provided, in particular with first flanges that are different from one another as well as second flanges that are different from one another, to be connected to motors that are different from one another and/or to driven devices that are different from one another. These differing forms of each half-housing can then be combined with one another as desired, at least group-wise. This means that when three different kinds of device are to be driven, to which correspond three different first flanges, by three different motors, to which correspond three different second flanges, altogether only three first half-housings and three second half-housings are needed in order to create the maximal number of combinations, namely nine.

Preferably the bearing mechanisms for the adapter shaft are provided in a single one of the half-housings. As a result, during manufacture precise centring can be achieved in an especially simple way. The stability or stiffness of the bearing is likewise optimal.

Preferably also there is provided a plurality of adapter shafts to make connection with pinions that differ from one another, and a plurality of coupling elements to make connection with motor shafts that differ from one another.

The variability of the adapter system can thereby be increased, in particular with respect to the torques of varying magnitude that are to be transmitted.

In another preferred embodiment of the invention a torque-transmitting mechanism is provided between the coupling element and the adapter shaft, which permits an at least temporary compensation of rotation-speed differences between the motor shaft and the device to be driven. Such a "functional subassembly" further increases the variability of the adapter system, so that the range of applications is broadened.

A torque-transmitting mechanism of this kind can consist of a sliding clutch, a fluid flywheel or a flexible coupling (or combinations thereof), depending on what is required for the intended use of the entire arrangement. Preferably in this case the driving means described at the outset is replaced by the torque-transmitting mechanism or coupling. This measure enables the production cost to be reduced.

As an additional supplementary function, in a preferred embodiment of the invention there is provided in or on the housing a braking means to slow or arrest the adapter shaft and/or the coupling element in at least one direction of rotation. This purpose can be served, for example, by a reverse-motion blocker or else a brake that operates in both directions of rotation, e.g. a mechanical, electromagnetically actuatable brake, so that the range of applications of the systems is extended in a simple manner.

In another preferred embodiment the housing comprises fixation means on which to seat a drive motor designed to stand on a base and/or mounting devices to fasten the housing to a pedestal or the like. As a result, rather than an "adjunct" the adapter system becomes a functional component that so to speak forms a structural centre of the whole arrangement to be produced. To incorporate a fixation means of this kind into gearings is not uncommon. In the present case, however, a gearing without such a fixatioin means for example can very easily be provided with one, so that in some circumstances there is no need to manufacture special gearings with fixation means as well as others without such means.

Preferably sealing devices are provided to seal the adapter shaft to the housing of the adapter system, so that a gearing with adapter system installed is a closed unit. This makes it possible to exchange an installed electric motor without leakage of oil and, also in other respects, in a particularly simple manner.

In another preferred embodiment of the invention the adapter system further comprises a blank flange, which can be connected to the first half-housing and then replaces the second half-housing. In this case the adapter shaft is so constructed that its second end projects out beyond the blank flange, so that a pulley or other drive component can be placed on it. The system thus enables an electric motor to be coupled to it by way of a belt train or the like—that is, without a connecting shaft. In this case a sealing means is preferably also provided in the blind flange, to seal the adapter shaft to the blind flange, so that the gearing with blind flange and shaft end projecting therefrom forms a closed unit.

BRIEF DESCRIPTION OF THE DRAWINGS

Preferred embodiments of the invention will be apparent from the subordinate claims and the following description of exemplary embodiments with reference to drawings, wherein FIG. 2 is a perspective drawing of an adapter shaft from FIG. 1, FIG. 3 is a perspective drawing of a coupling element from FIG. 1, FIG. 4 is a perspective drawing of the adapter shaft according to FIG. 2 from another angle, FIG. 5 is a plan view of a separator from FIG. 1, FIG. 6 shows a section through the separator according to FIG. 5 along the line VI—VI

DETAILED DESCRIPTION

Figure 1:
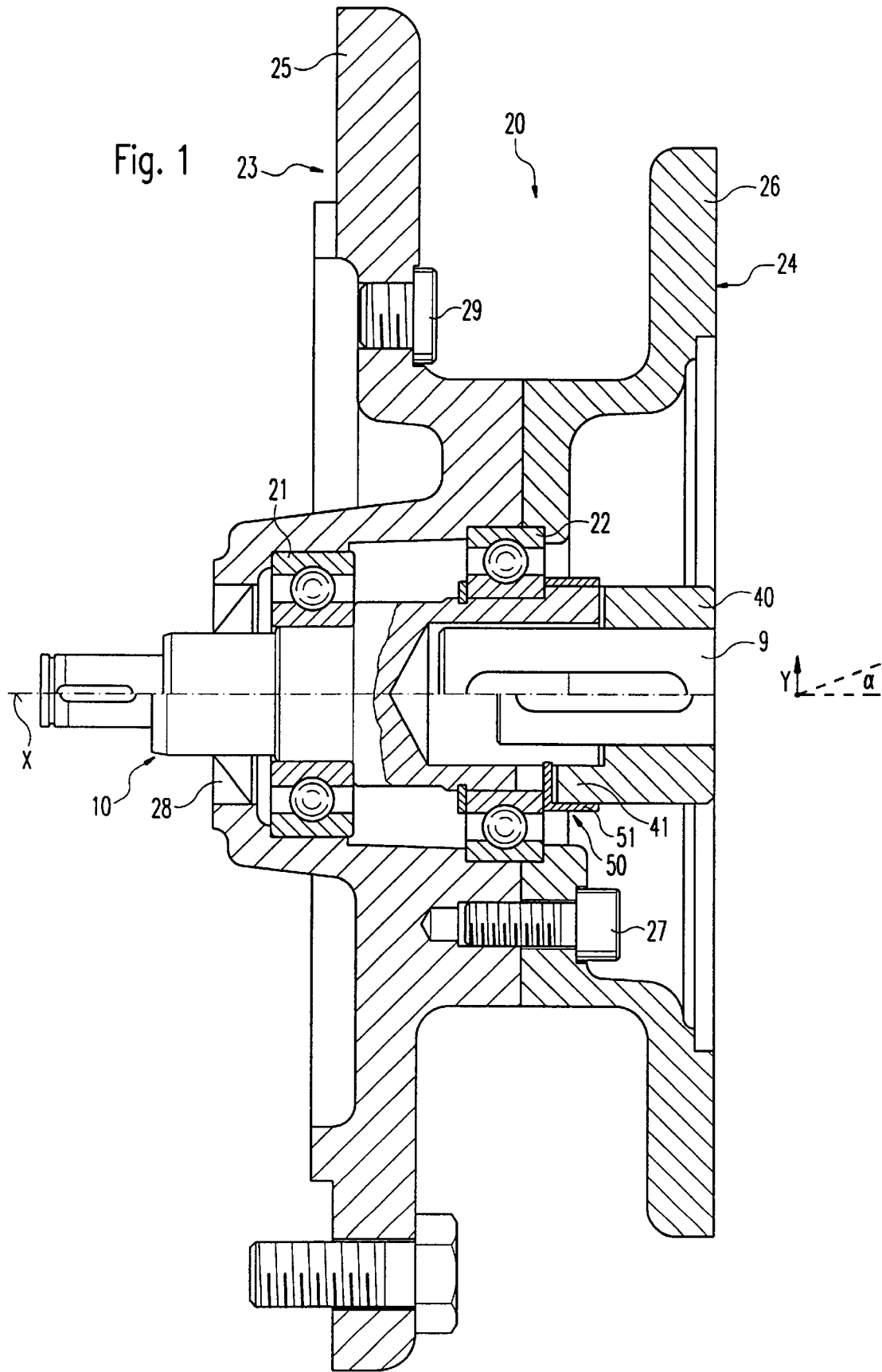
FIG. 1 shows a longitudinal section through a first embodiment of the invention.

In the following description, the same reference numerals are used for identical parts or parts with identical actions.

In the embodiment of the adapter system in accordance with the invention shown in FIG. 1, an adapter shaft 10 is supported in a housing 20 by way of two spaced apart roller bearings 21, 22. The housing 20 is composed of a first half-housing 25 and a second half-housing 26, which are rigidly joined to one another by means of connecting bolts 27. The bearings 21 and 22 are disposed in the first half-housing 25 such that the bearing shown on the right in FIG. 1 is held firmly in the first half-housing 25 by the second half-housing 26.

The adapter shaft 10 comprises at its first end a pinion attachment 11, to which a pinion can be attached in a rotationally stable manner, by the customary keyed joint. The adapter shaft 10 is sealed to the first half-housing 25 by means of a sealing ring 28.

The first half-housing 25 comprises an outward-facing first flange 23; the second half-housing 26 comprises a second flange 24, which faces in the opposite direction. The flange 25 is so constructed that by way of it, the housing 20 can be mounted on a device to be driven, in particular on a gearing. When this flange-mounting has been completed—that is, when a pinion (not shown here) has been put in place and the gearing attached—the gearing is sealed off from the exterior, so that after the arrangement has been filled with oil through a bore in the first half-housing 25 and the bore has been closed by a stopper 29, there is no possibility of leakage from the gearing.

The second flange 24 on the second half-housing 26 is so constructed that an electric motor can be mounted thereon.

Onto a motor shaft 9, only roughly indicated here, a coupling element 40 can be placed and fixed in a rotationally stable manner by way of a keyed joint known per se. The coupling element 40 comprises two projections 41, 41', extending in the direction of the axis of rotation x but radially displaced therefrom and diametrically opposed to one another, which can be inserted into notches 12, 12' that are formed in a second end of the adapter shaft 10 with a direction corresponding to the projections 41, 41'. The bore provided in the coupling element 40 by way of which the latter can be seated on a motor shaft 9 fits closely to the motor shaft, whereas in the second end of the adapter shaft a bore of larger diameter is provided, so that the part of the motor shaft 9 that extends beyond the coupling element 40 can be disposed so as to project into the adapter shaft 10.

The notches 12, 12' are sufficiently wide that the projections 41, 41' can be inserted into them with some clearance. This clearance is large enough for separators 50, one of which is shown in FIGS. 5 and 6, to be placed between the projections 41, 41' and the adjacent notch walls 13, 13' or 13'', 13''' (see FIGS. 2–4). Each separator 50 comprises a circumferential wall 51 and two sections 52, 52' that project inward therefrom, as well as a back wall 53 in the shape of a section of an annulus. The circumferential wall 51 and the sections 52, 52' are so shaped that the separator 50 can be set onto the second end of the adapter shaft 10 in a form-fitting manner, so that one wall of each of the sections 52, 52' is apposed to one of the notch walls 13, 13'' or 13' and 13''', while the back wall 53 can abut against an end face 15 of the second end of the shaft 9.

Two of the cap-shaped separators 50 are set onto the second end of the adapter shaft 10; the construction of the separator 50 as a pair of independent pieces offers the advantage that only the thickness of the walls of the inwards projecting sections 52, 52' must be matched to the gap between the projections 41, 41' and the notch walls 13, 13'' or 13', 13''', which simplifies manufacture. By contrast, in an alternative embodiment of the separator 50 shown in FIG. 1, which comprises a single, annular piece, the distances between the radially inward projecting sections 52, 52' (in this case, four such sections are provided) must also correspond to the distances between the notch walls 13—13''' of the notches 12, 12', which are milled with high precision.

In the adapter system in accordance with the invention, as discussed above, a plurality of different half-housings 25, 26 with various first and second flanges 23, 24 and various adapter shafts 10 are provided. An example of this is shown in FIGS. 7 to 9.

Figure 7:
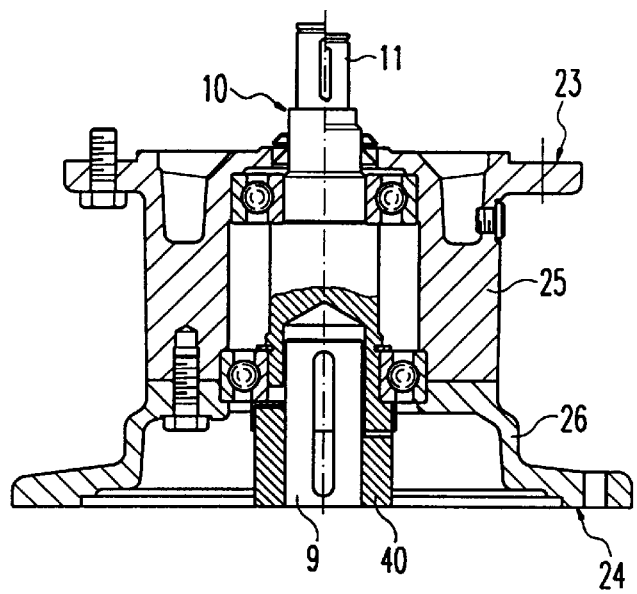
FIGS. 7–9 show three different variants of an adapter system to be used with different motors and different devices to be driven.
Figure 8:
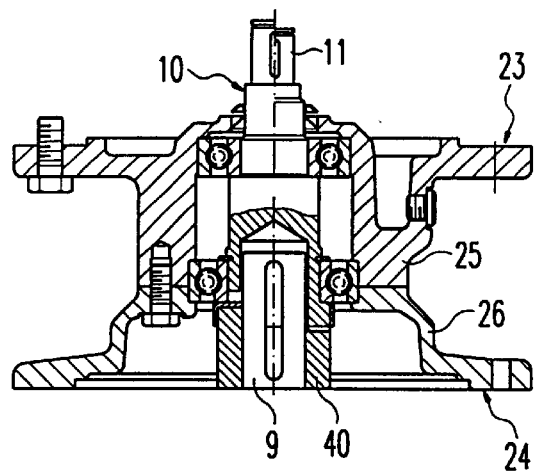
Figure 9:
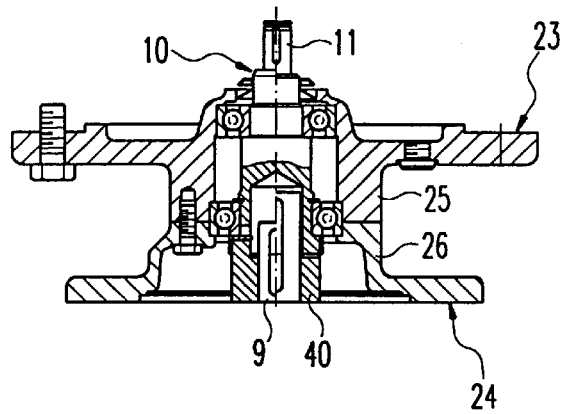

As can be seen in FIGS. 7, 8 and 9, in all three embodiments adapter flanges 23 are provided on the first half-housings 25 which have the same dimensions for mounting (on a gearing). The three embodiments differ with respect to the pinion attachments 11 of the adapter shafts 10, onto which various pinions can be placed, the bore diameters of which are matched to the crown-gear root diameter, so that the adapter can be attached to the same gear housing but connected to gearings that differ from one another in their transmission ratios.

The second flanges 24 on the second half-housings 26 also differ in the three embodiments, as do the coupling elements 40 and the shafts 9 of the electric motors mounted on the flanges. In the exemplary embodiments according to FIGS. 7 to 9, motors of different power categories with correspondingly different shaft diameters are attached to gearings, each of which is enclosed in the same kind of housing but has a different pinion diameter.

Figure 10:
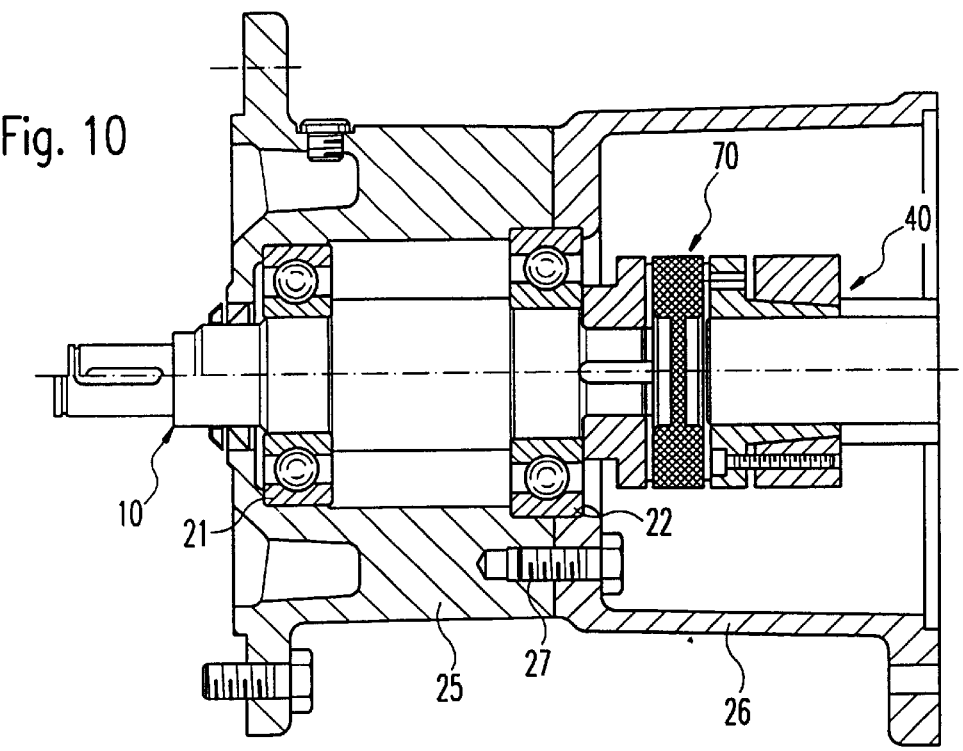
FIG. 10 shows another embodiment of the invention with a flexible coupling.

In the embodiment of the invention shown in FIG. 10, there is attached to the first half-housing 25 — within which, as explained above, the adapter shaft 10 is supported in a statically determined manner by way of the bearings 21 and 22 — a second half-housing 26, fixed by way of the threaded bolt 27, in which a flexible coupling 70 known per se is mounted to serve as coupling element 40. This embodiment of the invention is provided in particular to be used for the flange-mounting of servomotors, which are known to ensure very high angular accelerations and are intended to control extremely precise movement sequences.

Figure 11:
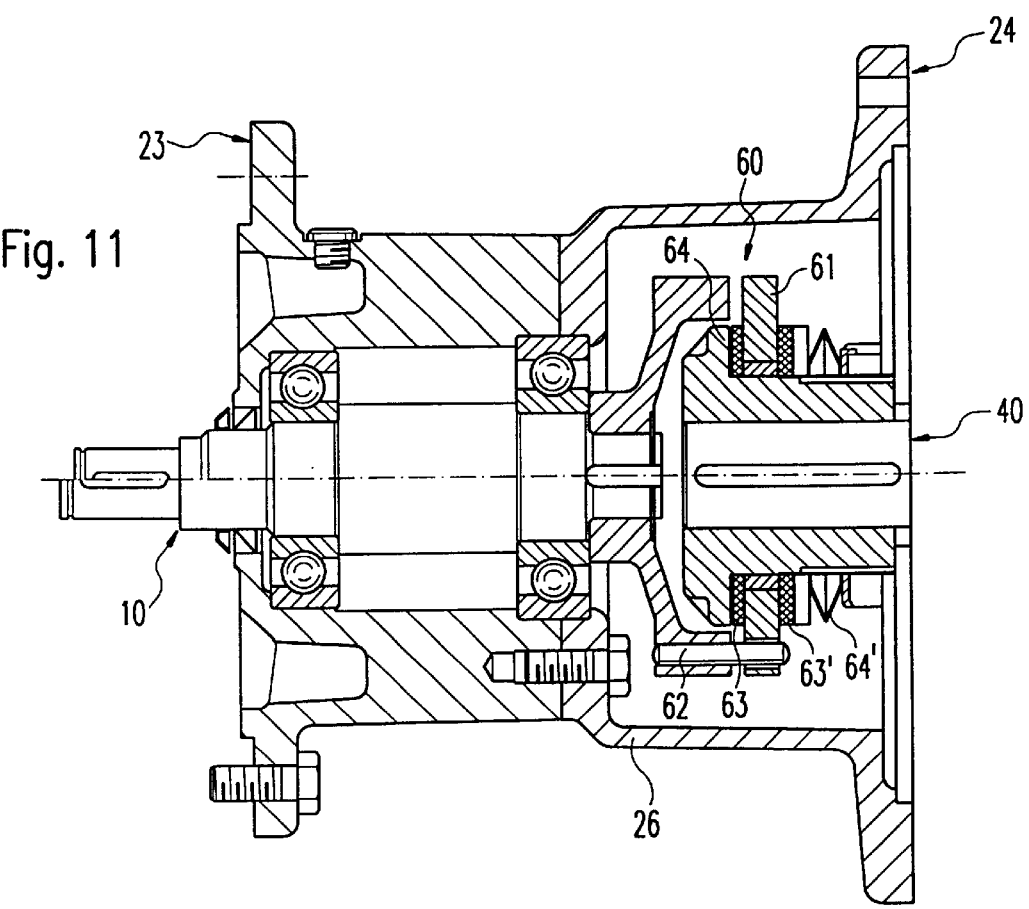
FIG. 11 shows another embodiment of the invention with a sliding clutch.

The embodiment of the invention shown in FIG. 11 differs from that according to FIG. 10 in that as coupling element 40 there is provided a sliding clutch 60, in which a disk 61 is rotatably mounted on the coupling element 40 and is connected to the adapter shaft 10 by a driving pin 62 in such a way that its rotation is transmitted. At its end surfaces the disk 61 is clamped between annular friction disks 63, 63', of which the disk 63, which faces the adapter shaft 10, abuts against a projection 64 extending radially outward from the coupling element 40, whereas the opposite friction disk 63' is pressed towards the adapter shaft 10 by a pair of spring washers 64'. With this arrangement, when the torque transmitted between the coupling element 40 and the adapter shaft 10 exceeds the frictional force between the friction disks 63, 63' and the disk 61, slippage occurs between the coupling element 40 and the adapter shaft 10. In another embodiment of the invention, not shown here, in the second half-housing 26 there are provided sensors for the mechanical detection of slippage.

Figure 12:
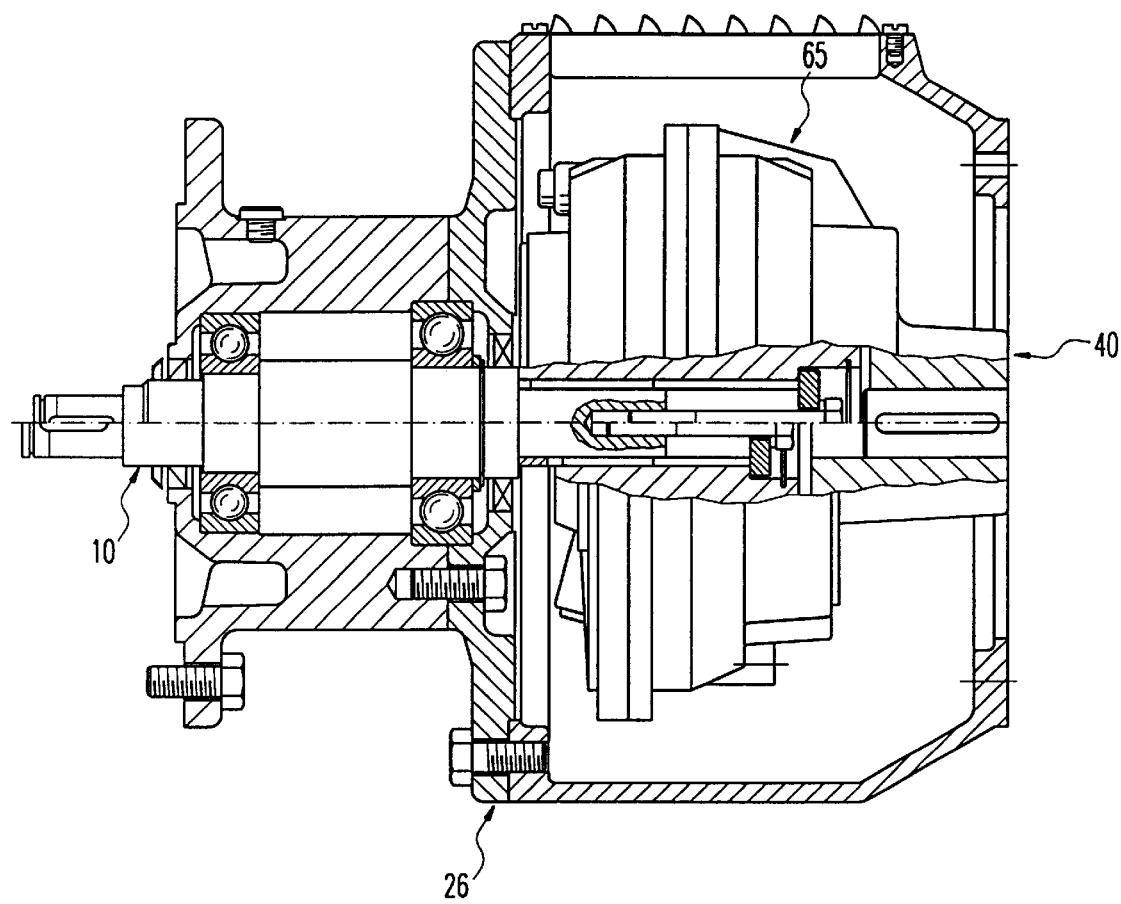
FIG. 12 shows another embodiment of the invention with a fluid flywheel.

The embodiment of the invention shown in FIG. 12 differs from that according to FIG. 11 in that instead of the sliding clutch 60 just described, the second half-housing 26 contains a fluid flywheel 65, which forms the second coupling element 40. Furthermore, in this case the second half-housing 26 is constructed in two parts, which considerably reduces the cost of manufacture and assembly. In addition, the adapter shaft 10 is sealed to the second half-housing 26 adjacent to its bearing therein. The fluid flywheel shown here is known per se.

Figure 13:
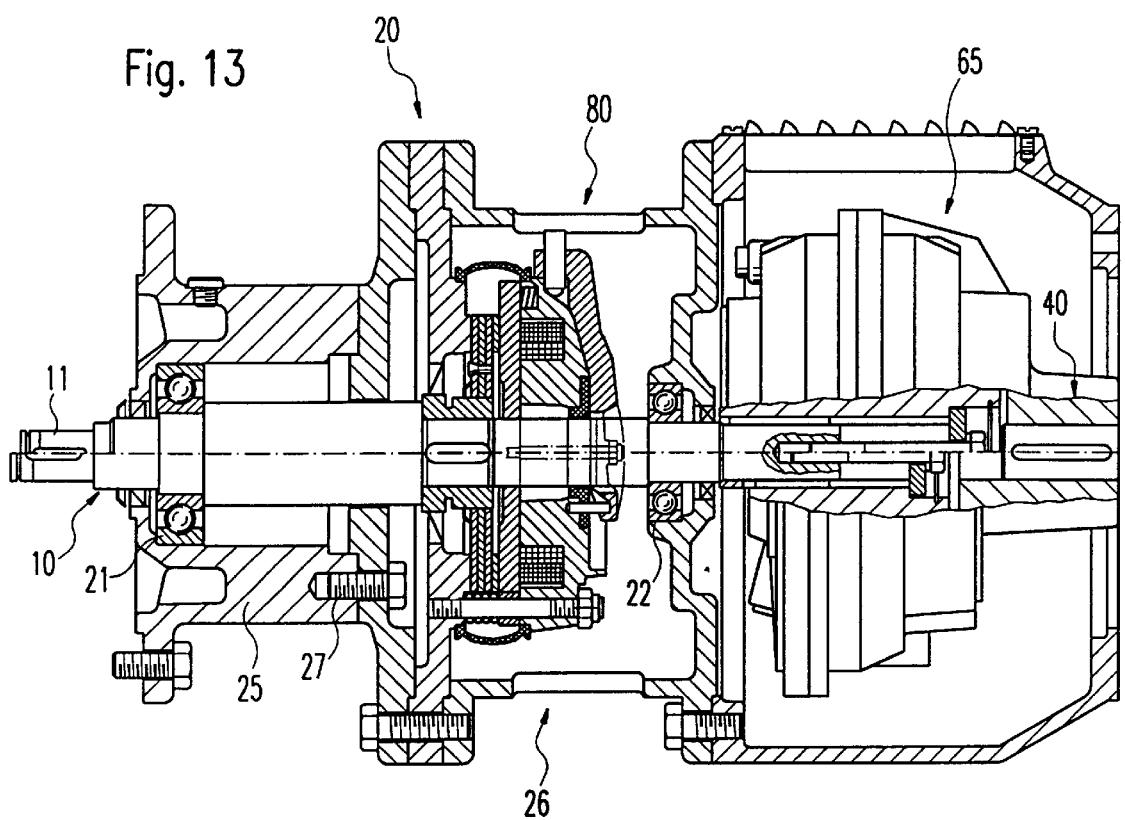
FIG. 13 shows another embodiment of the invention with an electromagnetically actuatable mechanical brake and additional fluid flywheel.

The further embodiment of the invention shown in FIG. 13 differs from that according to FIG. 12 in that the second half-housing 26 attached to the first half-housing 25 is composed of three pieces altogether. The part of the second half-housing 26 that is furthest away from the pinion attachment 11 of the adapter shaft 10, and which contains the coupling element 40, again encloses a fluid flywheel 65 and is constructed like the second part of the second half-housing 26 of the embodiment according to FIG. 12. The first part of the second half-housing 26, which is connected to the first half-housing 25 by means of the connecting bolt 27, corresponds in its structure to the first part of the second half-housing 26 of the embodiment according to FIG. 12.

Between this first and the third part of the second half-housing 26 in the embodiment according to FIG. 13, in a specially constructed middle housing section, there is provided an electromagnetically actuatable mechanical brake 80 which is known per se. This electromagnetically actuatable mechanical brake 80 is mounted in such a way that it can slow down or arrest the movement of the adapter shaft 10 (with respect to the housing 20).

The embodiment according to FIG. 13 further differs from that according to FIG. 12 with respect to the mounting of the adapter shaft 10: whereas its first bearing 21 is positioned in the first half-housing 25 as in the previously discussed embodiments, its second bearing 22 is here situated in the middle section of the second half-housing, the shaft having been made suitably longer. This measure ensures that on the one hand a statically determined mounting is produced, while on the other hand the second bearing 22 is seated as close as possible to the fluid flywheel 65, the electromagnetically actuatable mechanical brake 80 being disposed between the bearings 21 and 22.

Figure 14:
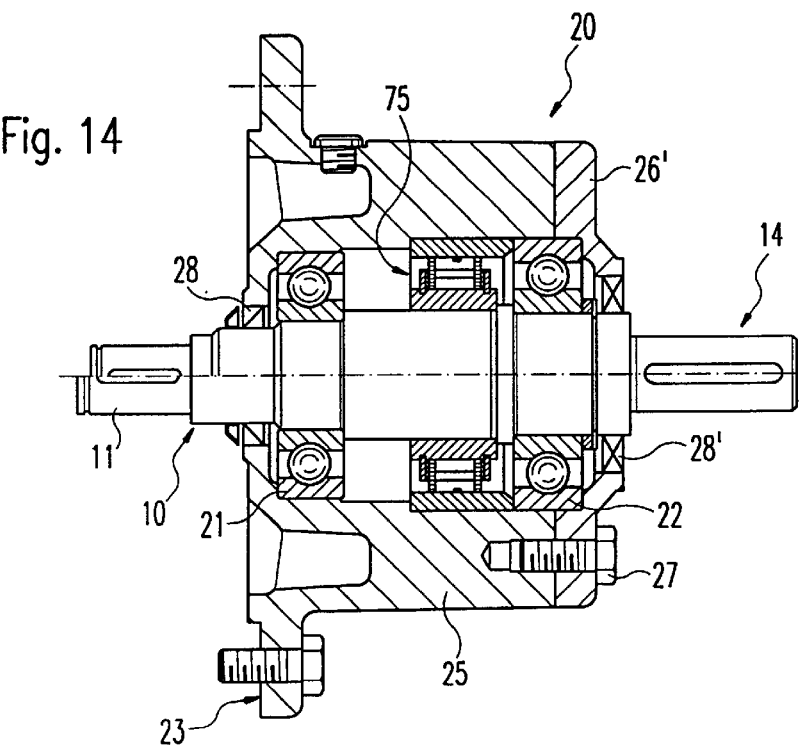
FIG. 14 shows another embodiment of the invention with a reverse-motion blocker.

The embodiment of the invention shown in FIG. 14 differs from those previously presented inasmuch as the second half-housing attached to the first half-housing 25 is constructed as a (simple) blank flange 26 through which the second end of the adapter shaft 10, i.e. the end away from the pinion attachment 11, passes by way of a sealing ring 28' so as to project outward. This second end 14 of the adapter shaft 10 is here so constructed that a pulley or the like can be keyed onto it. An adapter mechanism of this kind flange-mounted to a gear system by way of the first flange 23 on the first half-housing 25 is thus connected to an electric motor not by way of a shaft but by another drive train (belt drive, chain drive or similar couplings).

In addition, in the embodiment of the invention shown in FIG. 14 there is provided between the bearings 21 and 22 in the first half-housing 25 a reverse-motion brake 75, which permits the adapter shaft 10 to rotate in only one direction with respect to the housing 20. Reverse-motion brakes of this kind are known per se and will not be described further here. It is of course also possible to provide a reverse-motion brake 75 of this kind in an embodiment of the invention such as has been described, for example, with reference to FIGS. 1 to 12. Furthermore, it is of course possible not to incorporate the reverse-motion brake 75 in the present embodiment, as shown in FIG. 15.

Figure 15:
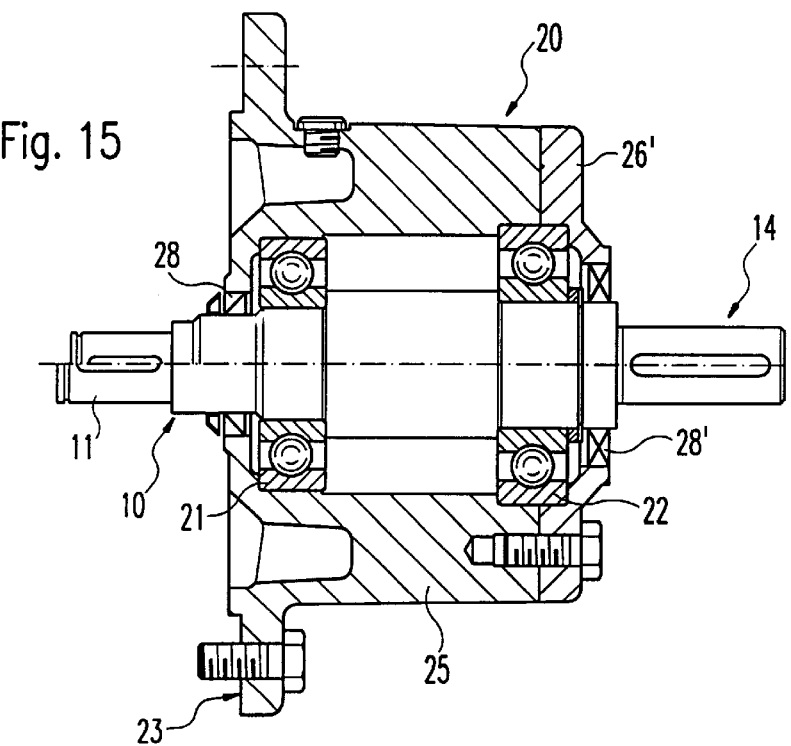
FIG. 15 shows another embodiment of the invention to explain a housing with blank flange.
Figure 16:
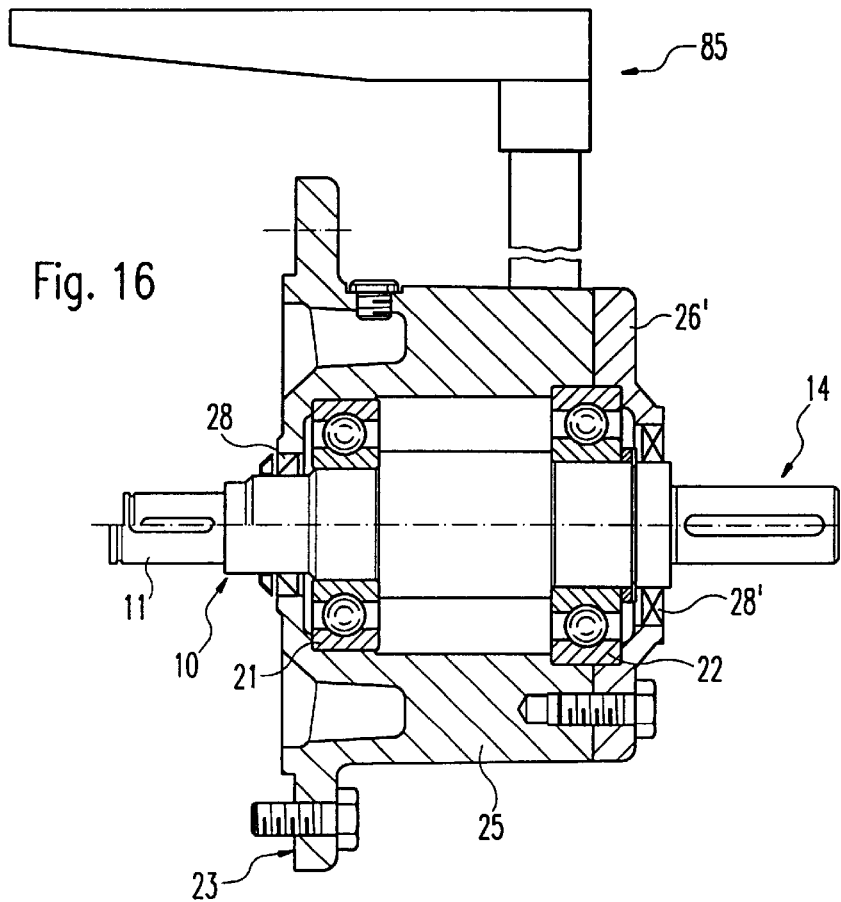
FIG. 16 shows another embodiment of the invention with fixation means for the installation of a motor.

The embodiment of the invention shown in FIG. 16 differs from that according to FIG. 15 substantially in that there is attached to the first half-housing 25 a fixation means 85 onto which a drive motor designed to stand on a base can be mounted, which then can be brought into rotationally stable connection with the adapter shaft 10, for instance by way of a belt drive.

Figure 17:
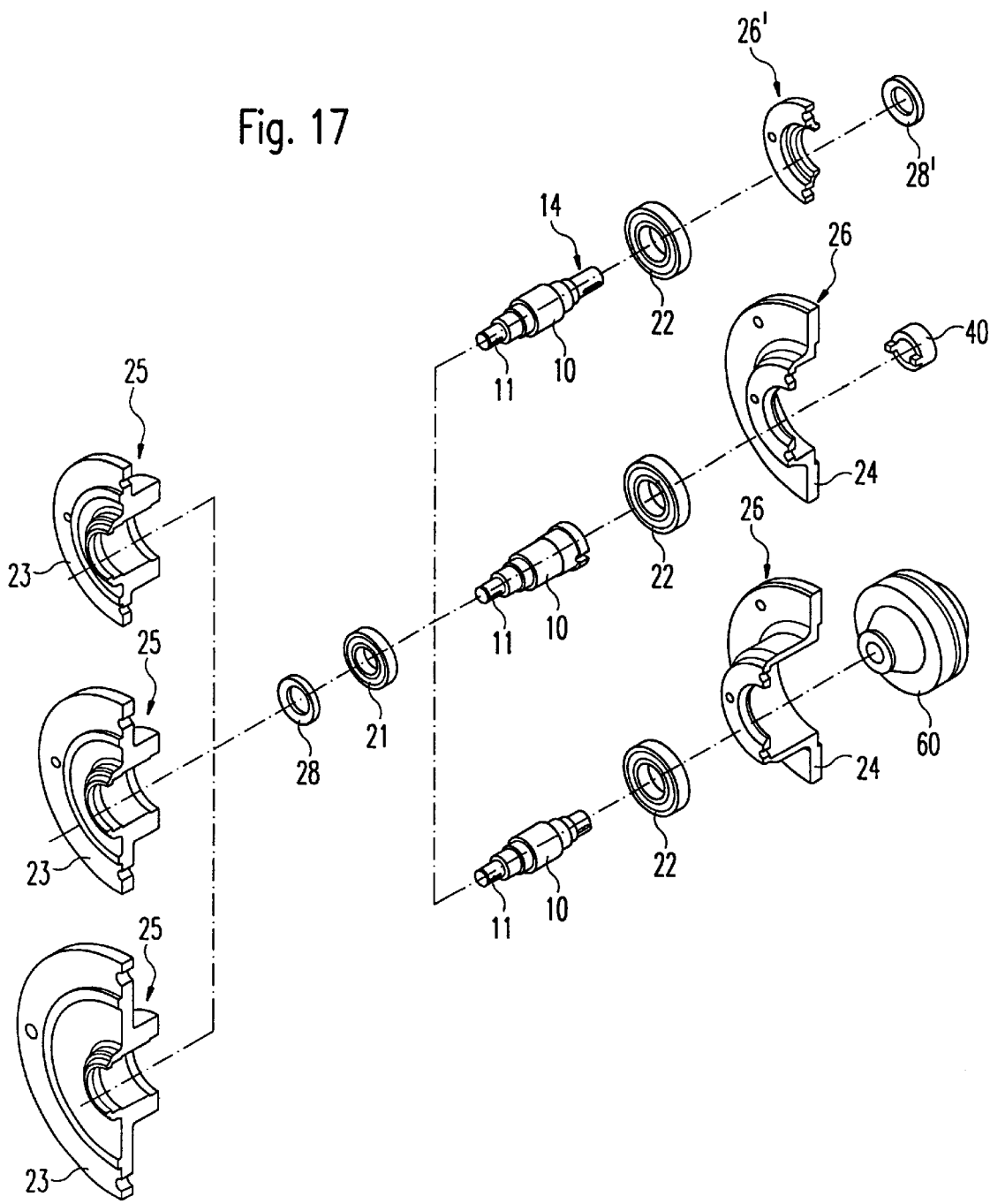
FIG. 17 is a schematic perspective drawing to explain possible combinations enabled by the invention, for use with pinions of a given bore diameter.

To explain the system as a whole, in FIG. 17 three different first half-housings 25 are shown, each of which comprises a different first flange 23 for the purpose of flange-mounting on gearings with various housings. The second half-housings 26 indicated in FIG. 17, which are to be attached to the first half-housings 25, likewise differ in the shape of their second flanges 24 or are constructed as a blank flange 26'.

The adapter shafts 10 shown in FIG. 17 are all equipped at their first ends with the same kind of pinion attachments 11, onto which pinions of identical bore diameter can be set. The second ends of the adapter shafts 10 are of various constructions: the one at the top of FIG. 17 has a projecting end as in the embodiment according to FIG. 15; in the middle in FIG. 17 is a second end corresponding to the embodiment shown in FIG. 1; and at the bottom in FIG. 17 is a second end to which a sliding clutch 60 is to be attached. The other individual components, already described above, can be identified by their reference numerals in FIG. 17.

Figure 18:
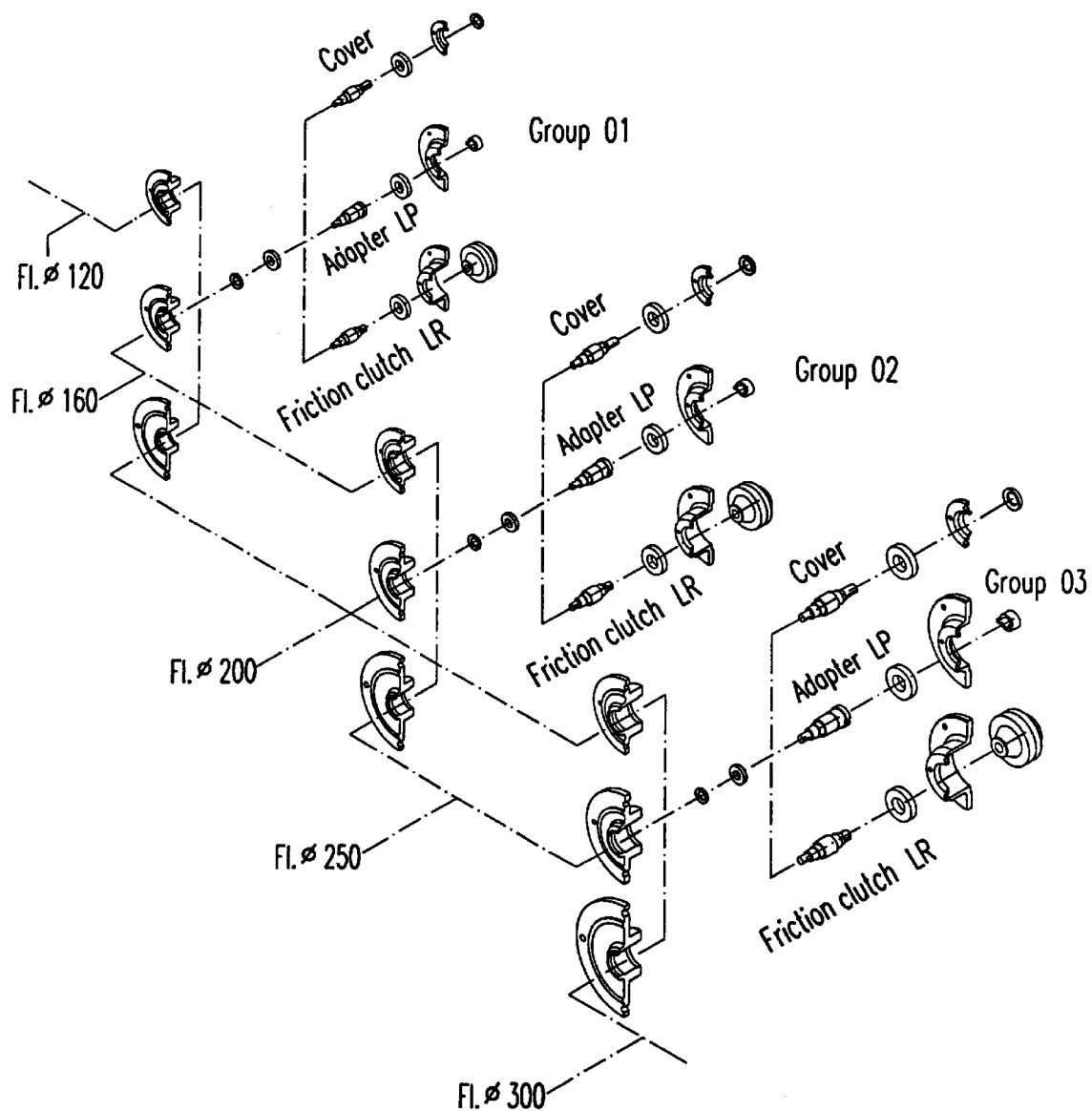
FIG. 18 is a perspective drawing to explain a larger combination group of adapter systems.

In FIG. 18 three groups of the system subgroup according to FIG. 17 are shown. From their (relative) dimensions and the labels in the figure, the variety of combinations possible with respect to the first flange can be seen. It should be pointed out that this drawing by no means shows the complete range of combinations available with the present system, but merely exemplifies what can be done with part of the whole system, the individual components of which have been described above.

List of Reference Numerals

9 Shaft
10 Adapter shaft
11 Pinion attachment
12 First notch
12' Second notch
13, 13'
13'',13''' Notch wall
14 Second end
15 End face
20 Housing
21 First bearing
22 Second bearing
23 First flange
24 Second flange
25 First half-housing
26 Second half-housing
26' Blind flange
27 Connecting bolt
28, 28' Sealing ring
29 Stopper
40 Coupling element
41 First projection
41' Second projection
50 Separator
51 Circumferential wall
52, 52' Section of separator
53 Back wall
60 Sliding clutch
61 Disk
62 Driving pin
63, 63' Friction disk
64 Projection
64' Spring washer
65 Fluid flywheel
70 Flexible coupling
75 Reverse-motion brake
80 Electromagnetically actuatable mechanical brake
85 Fixation means

What is claimed is:

1. Adapter system to connect a main motor shaft (9) of a drive motor to a device to be driven, in particular to a pinion of a gearing, comprising:

an adapter shaft (10) with a pinion attachment (11) at a first end for rotationally stable connection to the pinion;

a housing (20) with devices (21, 22) to serve as bearings for the adapter shaft (10) as well as with a first flange (23) for mounting on the gearing and with a second flange (24) for attachment to the motor, such that the motor is substantially firmly fixed to the gearing by way of the housing (20);

a coupling element (40) that can be connected in a rotationally stable manner to the motor shaft (9);

a first driving means (41, 41') on the coupling element (40) and a second driving means (12, 12') on the second end of the adapter shaft (10) tha t is shaped to correspond to the first driving means (41, 41') and engages therewith in order to transmit torque between the coupling element (40) and the adapter shaft (10);

wherein the first and the second driving means (41, 41', 12, 12') are so constructed as to be movable relative to one another at least in a direction (y) perpendicular to an axis of rotation (x) of the adapter shaft (10) and at an angle to the axis of rotation (x); and the first driving means comprises at least one notch (12, 12') with notch walls (13, 13'), which are disposed symmetrically with respect to a plane passing substantially through the axis of rotation (x) and the second driving means comprises at least one projection (41, 41') that can be inserted into the at least one notch (12, 12').

2. Adapter system according to claim 1, characterized in that the first and the second driving means (41, 41', 12, 12') are so constructed that they can be shifted relative to one another in a direction parallel to the axis of rotation (x) of the adapter shaft.

3. Adapter system according to claim 1, characterized in that the adapter shaft (10) is mounted in the housing (20) in a statically determined manner.

4. Adapter system according to claim 3, characterized in that the adapter shaft (10) is mounted by way of two bearings (21, 22) spaced apart in the direction of the axis of rotation (x), preferably by way of roller bearings.

5. Adapter system according to claim 1, characterized in that the at least one projection (41, 41') is thinner than the at least one notch (12, 12') to ensure that there is some clearance in the direction of rotation between the groove walls (13, 13') and the at least one projection (41, 41').

6. Adapter system according to claim 5, characterized by a separator (50) to be inserted between at least one of the notch walls (13, 13') and the at least one projection (41, 41').

7. Adapter system according to claim 6, characterized in that the separator (50) is elastically deformable and has dimensions such that it produces a force-fitting of the at least one projection (41, 41') within the at least one notch (12, 12').

8. Adapter system according to claim 6, characterized in that the separator (50) is constructed of a material suitable for reducing the friction between the notch walls (13, 13') and the at least one projection (41, 41').

9. Adapter system according to claim 1, characterized in that the first flange (23) is disposed on a first half-housing (25) and the second flange (24) is disposed on a second half-housing (26) and that the two halves of the housing (25, 26) are detachably connected to one another.

10. Adapter system according to claim 9, characterized in that a plurality of first and second half-housings (25, 26) with first flanges (23) that differ from one another and second flanges (24) that differ from one another are provided for attachment to at least one of devices to be driven that differ from one another and to motors that differ from one another.

11. Adapter system according to claim 9, characterized in that the devices (21, 22) to serve as bearings for the adapter shaft are provided in one of the half-housings (25, 26).

12. Adapter system according to claim 9, characterized by a blank flange (26') that can be connected to the first half-housing (25) so as to replace the second half-housing (26), such that the second end (14) of the adapter shaft (10) projects outward from the blank flange so that a pulley or similar driving component can be placed upon it.

13. Adapter system according to claim 12, characterized by a sealing device (28') to provide a leakproof seal between the adapter shaft (10) and the blank flange (26').

14. Adapter system according to claim 1, characterized in that a plurality of adapter shafts (10) is provided for connection to pinions that differ from one another and a plurality of coupling elements (40) is provided for connection to motor shafts that differ from one another.

15. Adapter system according to claim 1, characterized by a blocking device (75, 80) disposed with respect to the housing (20) to prevent rotation of one of the adapter shaft and the coupling element (40) in at least one direction.

16. Adapter system according to claim 1, characterized by sealing devices (28) to provide a leakproof seal between the adapter shaft (10) and the housing (20).

17. Adapter system to connect a main motor shaft (9) of a drive motor to a device to be driven, in particular to a pinion of a gearing, comprising:

an adapter shaft (10) with a pinion attachment (11) at a first end for rotationally stable connection to the pinion;

a housing (20) with devices (21, 22) to serve as bearings for the adapter shaft (10) as well as with a first flange (23) for mounting on the gearing and with a second flange (24) for attachment to the motor, such that the motor is substantially firmly fixed to the gearing by way of the housing (20);

a coupling element (40) that can be connected in a rotationally stable manner to the motor shaft (9);

a first driving means (41, 41') on the coupling element (40) and a second driving means (12, 12') on the second end of the adapter shaft (10) that is shaped to correspond to the first driving means (41, 41') and engages therewith in order to transmit torque between the coupling element (40) and the adapter shaft (10);

wherein the first and the second driving means (41, 41', 12, 12') are so constructed as to be movable relative to one another at least in a direction (y) perpendicular to an axis of rotation (x) of the adapter shaft (10) and at an angle to the axis of rotation (x); and a torque-transmission mechanism (60, 65, 70) between the coupling element (40) and the adapter shaft (10) for temporary compensation of any differences in rotation speed between the motor shaft and the device to be driven.

18. Adapter system according to claim 17, characterized in that the torque-transmission mechanism comprises one of a sliding clutch (60), a fluid flywheel (65), or a flexible coupling (70).

19. Adapter system according to claim 17, characterized in that the driving means (41, 41') are formed in the torque-transmission mechanism (60, 65, 70).

20. Adapter system to connect a main motor shaft (9) of of a drive moter to a device to be driven, in particular to a pinion of a gearing, comprising:

an adapter shaft (10) with a first end and an opposite second end (14), including a pinion attachment (11) at the first end for rotationally stable connection to the pinion;

a housing (20) with bearings (21, 22) for the adapter shaft (10) as well as with a first flange (23) for mounting on the gearing and with a second flange (26') for supporting the second end (14), such that the second end (14) extends outwardly beyond the second flange (26');

a coupling element (40) that can be connected in a rotationally stable manner to the motor shaft (9);

a first driving means (41, 41') on the coupling element (40) and a second driving means (12, 12') on the second end of the adapter shaft (10) that is shaped to correspond to the first driving means (41, 41') and engages therewith in order to transmit torque between the coupling element (40) and the adapter shaft (10);

wherein the first and the second driving means (41, 41', 12, 12') are so constructed as to be movable relative to one another at least in a direction (y) perpendicular to an axis of rotation (x) of the adapter shaft (10) and at an angle to the axis of rotation (x); and the housing (20) comprises fixation means (85) on which to mount the drive motor by way of its base or mounting means by which to attach the housing (20) to a pedestal.

21. Adapter system to connect a main motor shaft (9) of a drive motor to a device to be driven, in particular to a pinion of a gearing, comprising:

an adapter shaft (10) with a pinion attachment (11) at a first end for rotationally stable connection to the pinion;

a housing (20) with devices (21, 22) to serve as bearings for the adapter shaft (10) as well as with a first flange (23) for mounting on the gearing and with a second flange (24) for attachment to the motor, such that the motor is substantially firmly fixed to the gearing by way of the housing (20);

a coupling element (40) that can be connected in a rotationally stable manner to the motor shaft (9);

a first driving means (41, 41') on the coupling element (40) and a second driving means (12, 12') on the second end of the adapter shaft (10) that is shaped to correspond to the first driving means (41, 41') and engages therewith in order to transmit torque between the coupling element (40) and the adapter shaft (10);

wherein the first and the second driving means (41, 41', 12, 12') are so constructed as to be movable relative to one another at least in a direction (y) perpendicular to an axis of rotation (x) of the adapter shaft (10) and at an angle to the axis of rotation (x); and the first flange (23) is disposed on a first half-housing (25) and the second flange (24) is disposed on a second half-housing (26) and the two halves of the housing (25, 26) are detachably connected to one another;

a plurality of first and second half-housings (25, 26) with first flanges (23) that differ from one another and second flanges (24) that differ from one another for attachment to at least one of devices to be driven that differ from one another and to motors that differ from one another; and the devices (21, 22) to serve as bearings for the adapter shaft are provided in one of the half-housings (25, 26).

22. Adapter system according to claim 21, characterized in that the first and the second driving means (41, 41', 12, 12') are so constructed that they can be shifted relative to one another in a direction parallel to the axis of rotation (x) of the adapter shaft.

23. Adapter system according to claim 21, characterized in that the adapter shaft (10) is mounted in the housing (20) in a statically determined manner.

24. Adapter system according to claim 23, characterized in that the adapter shaft (10) is mounted by way of two bearings (21, 22) spaced apart in the direction of the axis of rotation (x), preferably by way of roller bearings.

25. Adapter system according to claim 21, characterized in that the first driving means comprises at least one notch (12, 12') with notch walls (13, 13'), which are disposed symmetrically with respect to a plane passing substantially through the axis of rotation (x) and that the second driving means comprises at least one projection (41, 41') that can be inserted into the at least one notch (12, 12').

26. Adapter system according to claim, 25 characterized in that the at least one projection (41, 41') is thinner than the at least one notch (12, 12') to ensure that there is some clearance in the direction of rotation between the groove walls (13, 13') and the at least one projection (41, 41').

27. Adapter system according to claim 26, characterized by a separator (50) to be inserted between at least one of the notch walls (13, 13') and the at least one projection (41, 41').

28. Adapter system according to claim 27, characterized in that the separator (50) is elastically deformable and has dimensions such that it produces a force-fitting of the at least one projection (41, 41') within the at least one notch (12, 12').

29. Adapter system according to claim 27, characterized in that the separator (50) is constructed of a material suitable for reducing the friction between the notch walls (13, 13') and the at least one projection (41, 41').

30. Adapter system according to claim 21, characterized in that a plurality of adapter shafts (10) is provided for connection to pinions that differ from one another and a plurality of coupling elements (40) is provided for connection to motor shafts that differ from one another.

31. Adapter system according to claim 21, characterized by a torque-transmission mechanism (60, 65, 70) between the coupling element (40) and the adapter shaft (10) for temporary compensation of any differences in rotation speed between the motor shaft and the device to be driven.

32. Adapter system according to claim 31, characterized in that the driving means (41, 41') are formed in the torque-transmission mechanism (60, 65, 70).

33. Adapter system according to claim 31, characterized in that the torque-transmission mechanism comprises one of a sliding clutch (60), a fluid flywheel (65), or a flexible coupling (70).

34. Adapter system according to claim 21, characterized by a blocking device (75, 80) disposed with respect to the housing (20) to prevent rotation of one of the adapter shaft and the coupling element (40) in at least one direction.

35. Adapter system according to claim 21, characterized in that the housing (20) comprises fixation means (85) on which to mount the drive motor.

36. Adapter system according to claim 21, characterized by sealing devices (28) to provide a leakproof seal between the adapter shaft (10) and the housing (20).

37. Adapter system according to claim 21, characterized by a blank flange (26') that can be connected to the first half-housing (25), such that the second end (14) of the adapter shaft (10) projects outward from the blank flange so that a pulley or similar driving component can be placed upon it.

38. Adapter system according to claim 37, characterized by a sealing device (28') to provide a leakproof seal between the adapter shaft (10) and the flange (26').

* * * * *